US008276474B2

(12) United States Patent
Kim et al.

(10) Patent No.: US 8,276,474 B2
(45) Date of Patent: Oct. 2, 2012

(54) POWER TRANSMISSION DEVICE AND IMAGE FORMING APPARATUS HAVING THE SAME

(75) Inventors: Soo Yong Kim, Seoul (KR); Jun Young Lee, Yongin-si (KR); Sung Wook Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 958 days.

(21) Appl. No.: 11/971,228

(22) Filed: Jan. 9, 2008

(65) Prior Publication Data

US 2008/0190242 A1 Aug. 14, 2008

(30) Foreign Application Priority Data

Feb. 14, 2007 (KR) ........................ 10-2007-0015612

(51) Int. Cl.
*F16H 57/00* (2006.01)
*F16H 15/06* (2006.01)
*F16H 35/00* (2006.01)
*F16H 35/18* (2006.01)

(52) U.S. Cl. ................ 74/405; 74/29; 74/842; 74/10.39

(58) Field of Classification Search ................. 192/82 P; 74/10.39, 405, 6–9, 29, 30, 120, 130, 482; 271/114
See application file for complete search history.

(56) References Cited

U.S. PATENT DOCUMENTS 1,780,858 A * 11/1930 Bearens .......................... 74/359
2,161,540 A * 6/1939 Tager ............................ 242/595
3,556,017 A * 1/1971 Floehr ........................... 105/251
3,744,331 A * 7/1973 Caldwell ......................... 74/405
3,866,485 A * 2/1975 Blatt ............................... 74/422
4,022,309 A * 5/1977 Denkowski et al. ......... 192/48.5
4,569,427 A * 2/1986 F'Geppert .................. 192/69.91
4,900,003 A * 2/1990 Hashimoto .................. 271/114
5,358,230 A * 10/1994 Ikemori et al. ................ 271/114
5,456,543 A * 10/1995 Witte et al. ................... 400/577
5,507,373 A * 4/1996 Nguyen ....................... 192/3.58

(Continued)

FOREIGN PATENT DOCUMENTS

EP 0 883 226 12/1998

(Continued)

OTHER PUBLICATIONS

Communication issued by the European Patent Office on Jun. 17, 2008.

*Primary Examiner* — Justin Krause
*Assistant Examiner* — Matthew R Vaerewyck
(74) *Attorney, Agent, or Firm* — Staas & Halsey LLP

(57) ABSTRACT

A power transmission device and an image forming apparatus having the same that is capable of reliably transmitting intermittent power to a driven component from a driving source. The power transmission device includes a shaft, a first intermittent gear to receive power from the driving source and to rotate on the shaft, a second intermittent gear arranged so as to move between a first position in which the second intermittent gear is connected to the first intermittent gear along an axial direction of the shaft and a second position in which the second intermittent gear is disconnected from the first intermittent gear, a sliding unit arranged so as to slide along the shaft and to move the second intermittent gear in the axial direction of the shaft, and a driving unit to drive the sliding unit.

13 Claims, 6 Drawing Sheets

U.S. PATENT DOCUMENTS

| | | | | |
|---|---|---|---|---|
| 5,718,313 | A * | 2/1998 | Sekine | 192/24 |
| RE39,054 | E * | 4/2006 | Kagata et al. | 475/198 |
| 7,296,790 | B2 * | 11/2007 | Kim | 271/114 |
| 7,669,496 | B2 * | 3/2010 | Takahashi | 74/337 |
| 8,014,934 | B2 * | 9/2011 | Layer | 701/113 |
| 8,028,986 | B2 * | 10/2011 | Koga et al. | 271/10.01 |
| 8,141,457 | B2 * | 3/2012 | Chu et al. | 74/665 F |
| 2002/0007688 | A1 * | 1/2002 | Punko | 74/405 |
| 2011/0280626 | A1 * | 11/2011 | Fukushima et al. | 399/167 |
| 2011/0303028 | A1 * | 12/2011 | Yu et al. | 74/30 |

FOREIGN PATENT DOCUMENTS

| | | | |
|---|---|---|---|
| EP | 1 715 390 | | 4/2008 |
| FR | 2551818 | A1 * | 3/1985 |
| JP | 57145735 | A * | 9/1982 |
| JP | 59200814 | A * | 11/1984 |
| JP | 5-61315 | | 3/1993 |
| JP | 2004-37599 | | 2/2004 |

* cited by examiner

POWER TRANSMISSION DEVICE AND IMAGE FORMING APPARATUS HAVING THE SAME

CROSS-REFERENCE TO RELATED APPLICATION

This application claims all benefits accruing under 35 U.S.C. §119 from Korean Patent Application No. 2007-15612, filed in the Korean Intellectual Property Office on Feb. 14, 2007, the disclosure of which is incorporated herein by reference.

BACKGROUND OF THE INVENTION

1. Field of the Invention

Aspects of the present invention relate to an image forming apparatus, and more particularly to an image forming apparatus having a power transmission device that intermittently transmits power to a driven component from a driving source.

2. Related Art

An image forming apparatus is an apparatus that prints an image onto a printable medium, such as paper, according to an inputted image signal. Although image forming apparatuses include different components depending on the type of the image forming apparatus, image forming apparatuses generally include a paper supply unit that supplies a printable medium, a print unit that prints an image onto the printable medium, and a paper discharge unit that discharges the printed printable medium.

The paper supply unit, the print unit, and the paper discharge unit include various components, such as rollers, photosensitive bodies, belts, etc., to perform the paper feeding operation and the printing operation. These components are driven by a driving source, such as a motor. In order to save component costs, it is preferable to use as few motors as possible. Thus, in many cases, the image forming apparatus is constructed so that multiple components are driven by a single motor. For this purpose, a power transmission device is disposed on a path through which power from the motor is transmitted to the components. The power transmission device transmits power only to the components needing to be driven, and interrupts power to the components that do not need to be driven.

An electronic clutch is conventionally used as the power transmission device. However, electric current should be continuously applied to the electronic clutch. Accordingly, when successively transmitting power over a long period of time, heat is generated from the electronic clutch, reducing performance and contributing to malfunctions.

A malfunction of the electronic clutch may cause rough printing operation or a decrease in image quality. For example, if the electronic clutch malfunctions so that power is not transmitted to the developing device at the correct time, toner cannot be supplied and the image may not be developed well on the printable medium. If the electronic clutch malfunctions so that power is transmitted to the developing device when the developing device should not operate, the toner in the developing device is unnecessarily subject to stress and a decrease in quality, resulting in deterioration of image quality.

SUMMARY OF THE INVENTION

Aspects of the present invention provide a power transmission device and an image forming apparatus that is capable of reliably transmitting intermittent power to a driven component from a driving source.

According to an aspect of the invention, a power transmission device of an image forming apparatus, which intermittently transmits power to a driven component from a driving source, is provided. The power transmission device comprises a shaft; a first intermittent gear to receive power from the driving source and to rotate on the shaft; a second intermittent gear arranged so as to move between a first position in which the second intermittent gear is connected to the first intermittent gear along an axial direction of the shaft and a second position in which the second intermittent gear is disconnected from the first intermittent gear; a sliding unit arranged so as to slide along the shaft and to move the second intermittent gear in the axial direction of the shaft; and a driving unit which to drive the sliding unit.

According to another aspect of the invention, the driving unit includes a motor that rotates in a forward direction and a reverse direction.

According to another aspect of the invention, the sliding unit includes a power transforming part to transform a rotational motion of the motor into a linear motion.

According to another aspect of the invention, the power transforming part includes a rack gear.

According to another aspect of the invention, the second intermittent gear is rotatably mounted to the sliding unit.

According to another aspect of the invention, the first intermittent gear comprises a first coupling part arranged along the axial direction of the shaft; and the second intermittent gear comprises a second coupling part arranged along the axial direction of the shaft opposite the first coupling part so as to engage the second intermittent gear with the first intermittent gear each other.

According to another aspect of the invention, a power transmission device of an image forming apparatus, which intermittently transmits power to a driven component from a driving source, is provided. The power transmission device comprises a shaft; a first intermittent gear to receive power from the driving source and arranged so as to rotate on the shaft; a sliding unit slidably mounted to the shaft; a second intermittent gear rotatably mounted to the sliding unit and so as to transmit power to the driven component when rotating; and a motor to move the sliding unit between a first position in which the second intermittent gear is connected to the first intermittent gear and a second position in which the second intermittent gear is disconnected from the first intermittent gear.

According to another aspect of the invention, the sliding unit includes a hollow sliding body through which the shaft is inserted and a rack gear provided on the hollow sliding body.

According to another aspect of the invention, an image forming apparatus is provided, including a driving source, a power transmission gear to receive power from the driving source and arranged so as to rotate, and a power transmission device to intermittently transmit power to a driven component from the driving source. The power transmission device includes a shaft; a first intermittent gear engaged with the power transmission gear so as to rotate on the shaft; a second intermittent gear arranged so as to rotate on the shaft to receive power from the first intermittent gear, and to transmit power to the driven component; a sliding unit arranged so as to slide along the shaft in an axial direction of the shaft and to move the second intermittent gear between a first position in which the second intermittent gear is connected to the first intermittent gear and a second position in which the second intermittent gear is disconnected from the first intermittent gear; and a driving unit to drive the sliding unit.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
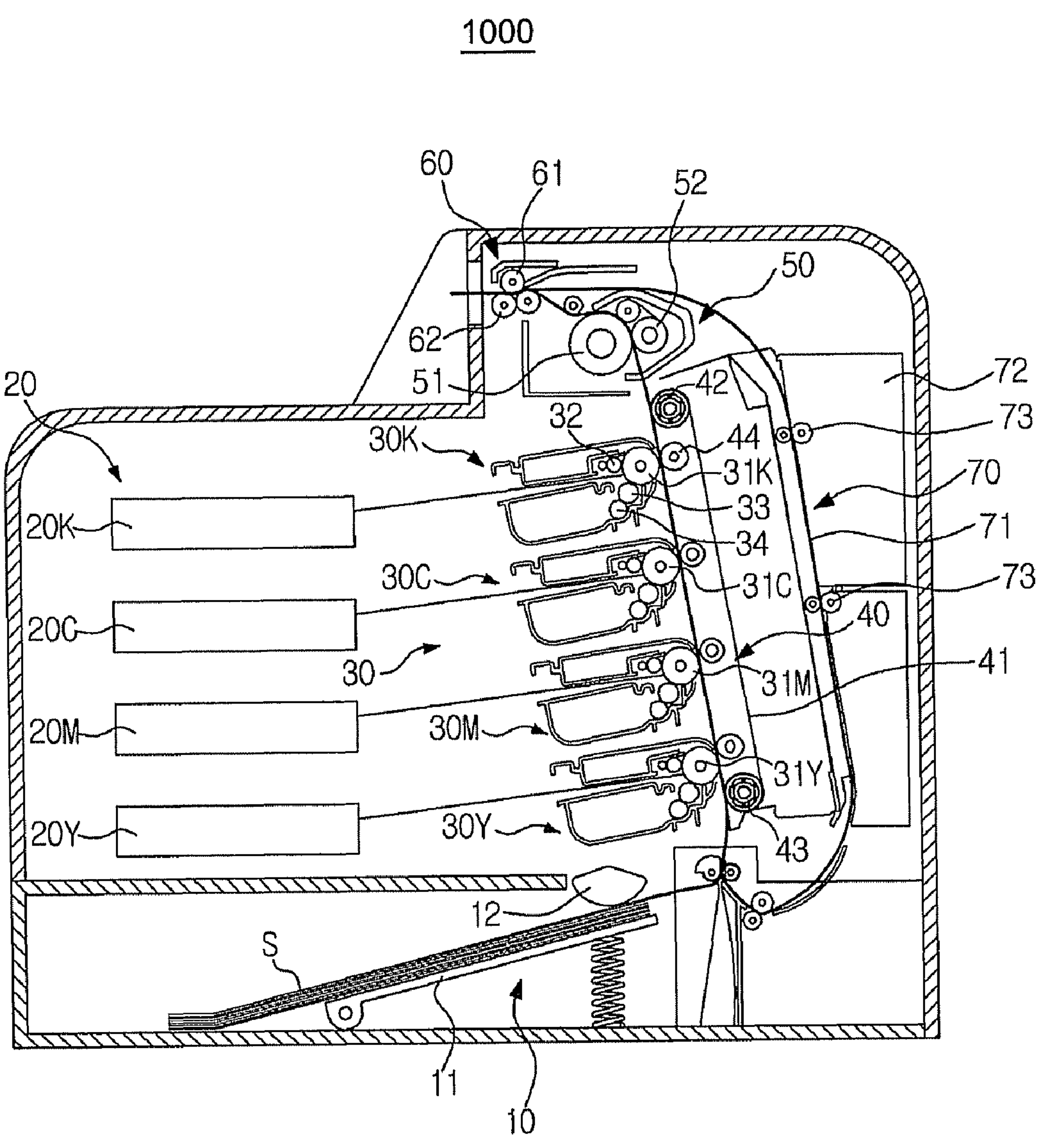
FIG. 1 is a sectional view illustrating the constitution of an image forming apparatus according to an example embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 2:
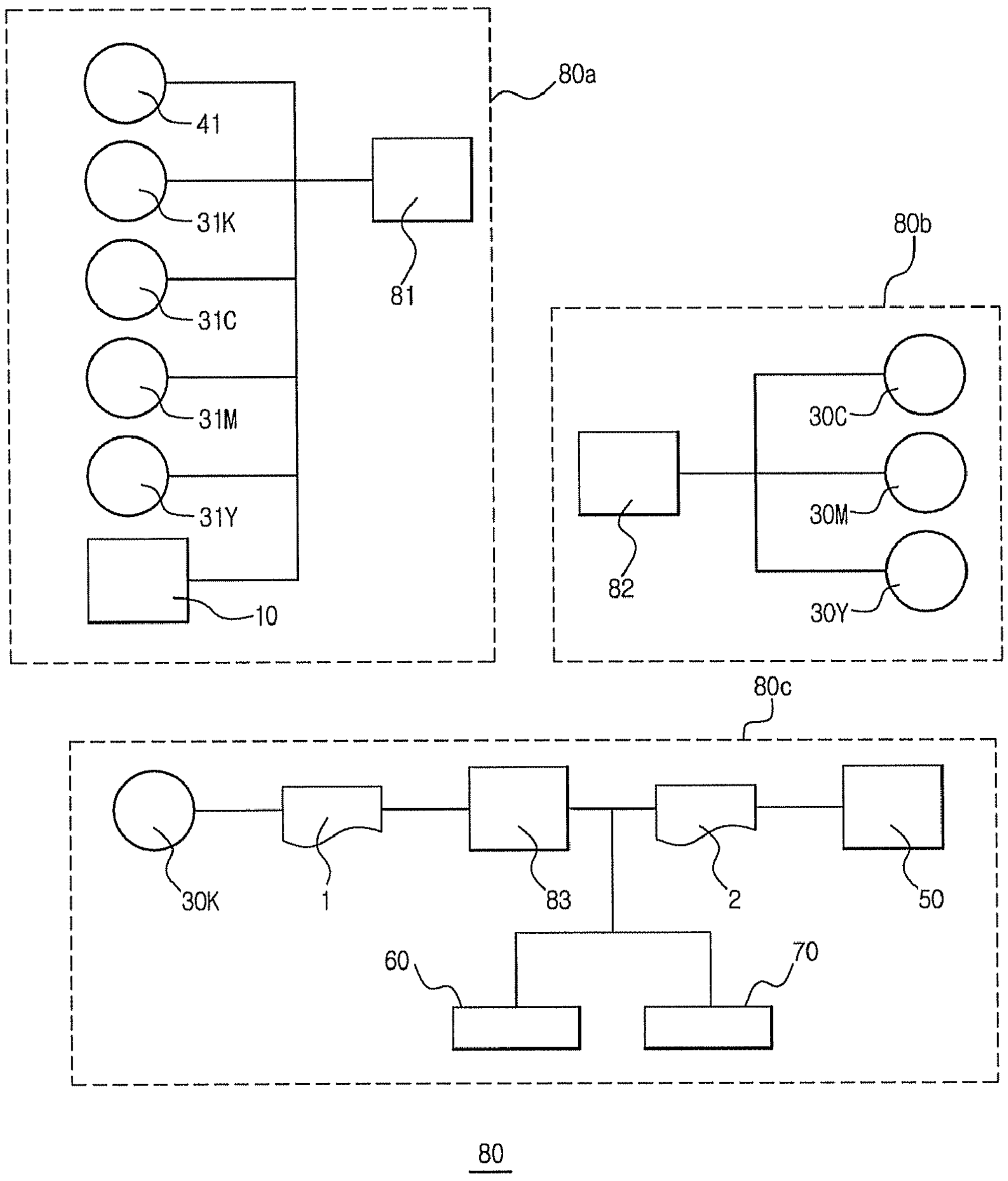
FIG. 2 is a constitutional view illustrating a driving mechanism of the image forming apparatus shown in FIG. 1.

FIG. 1 is a sectional view illustrating the constitution of an image forming apparatus 1000 according to an example embodiment of the present invention. FIG. 2 is a constitutional view illustrating a driving mechanism of the image forming apparatus 1000. The image forming apparatus may be, for example, a printer, a facsimile machine, or a multi-function device.

As shown in FIG. 1, the image forming apparatus 1000 includes a paper supply unit 10, an exposure unit 20, a development unit 30, a transfer unit 40, a fixing unit 50, a paper discharge unit 60, and a duplex print unit 70. According to other aspects of the invention, the image forming apparatus 1000 may include additional and/or different units. Similarly, the functionality of two or more of the above units may be combined into a single component.

The paper supply unit 10 supplies a printable medium, such as paper S. The paper supply unit 10 includes a paper tray 11 on which the paper S is loaded and a pickup roller 12 that picks up the paper S loaded on the paper tray 11. The paper S picked up by the pickup roller 12 is fed to the development unit 30.

The development unit 30 includes four developing devices 30Y, 30M, 30C, and 30K, in which toners of different colors, such as yellow (Y), magenta (M), cyan (C), and black (K), are contained. The developing devices 30Y, 30M, 30C, and 30K are provided with photosensitive bodies 31Y, 31M, 31C, and 31K on which an electrostatic latent image is formed by the exposure unit 20. The respective exposure units 20Y, 20M, 20C and 20K irradiate light corresponding to image information of yellow (Y), magenta (M), cyan (C), and black (K) to the photosensitive bodies 31Y, 31M, 31C, and 31K of the respective developing devices, according to a print signal.

Each of the developing devices 30Y, 30M, 30C, and 30K includes a charge roller 32, a developing roller 32, and a supply roller 34. The charge roller 32 charges each of the photosensitive bodies 31Y, 31M, 31C, and 31K. The developing roller 33 develops the electrostatic latent image formed on each of the photosensitive bodies 31Y, 31M, 31C, and 31K into a toner image. The supply roller 34 adheres the toner to the developing roller 33.

The transfer unit 40 transfers the toner image developed on the photosensitive bodies to the paper S. The transfer unit 40 includes a transfer belt 41, a driving roller 42, a tension roller 43, and four transfer rollers 44. The transfer belt 41 circulates while contacting the photosensitive bodies 31Y, 31M, 31C, and 31K. The driving roller 42 drives the transfer belt 41. The tension roller 43 maintains a constant tensile force on the transfer belt 41. The transfer rollers 44 transfer the toner image developed on the photosensitive bodies 31Y, 31M, 31C, and 31K onto the paper S.

The fixing unit 50 fixes the transferred image onto the paper S through application of heat and pressure. The fixing unit 50 includes a heat roller 51 having a heat source to heat the toner-transferred paper and a press roller 52 disposed opposite the heat roller 51 to maintain a constant fixing pressure with the heat roller 51.

The paper discharge unit 60 discharges the paper S on which an image has been formed. The paper discharge unit 60 includes a rotating discharge roller 61 and a discharge backup roller 62 disposed opposite the discharge roller 61.

The duplex print unit 70 feeds the paper S, which is printed on one surface, toward the upstream side of the development unit 30 so as to form an image onto the other surface. The duplex print unit 70 includes a guide frame 72 forming a duplex-print path 71 and duplex-print feed rollers 73 mounted on the duplex-print path 71 to feed the paper.

As shown in FIG. 2, the image forming apparatus 1000 further includes a driving unit 80 that drives all the driven components. The driving unit 80 includes a first driving part 80*a* having a first driving source 81, a second driving part 80*b* having a second driving source 82, and a third driving part 80*c* having a third driving source 83.

The first driving source 81 drives the paper supply unit 10; the photosensitive bodies 31Y, 31M, 31C, and 31K of the development unit 30; and the transfer belt 41, via a power transmission, such as a coupling unit, a gear train, or the like. The second driving source 82 drives rollers mounted to the developing device 30Y of yellow, the developing device 30M of magenta and the developing device 30C of cyan.

The third driving source 83 drives rollers mounted to the developing device 30K of black (hereinafter referred to as the black developing device), the fixing unit 50, the paper discharge unit 60, and the duplex print unit 70. A power transmission device 1 is arranged between the third driving source 83 and the black developing device 30K to intermittently transmit power from the third driving source 83 to the black developing device 30K. A oneway clutch 2, which transmits power in only one direction, is mounted between the third driving source 83 and the fixing unit 50.

Figure 3:
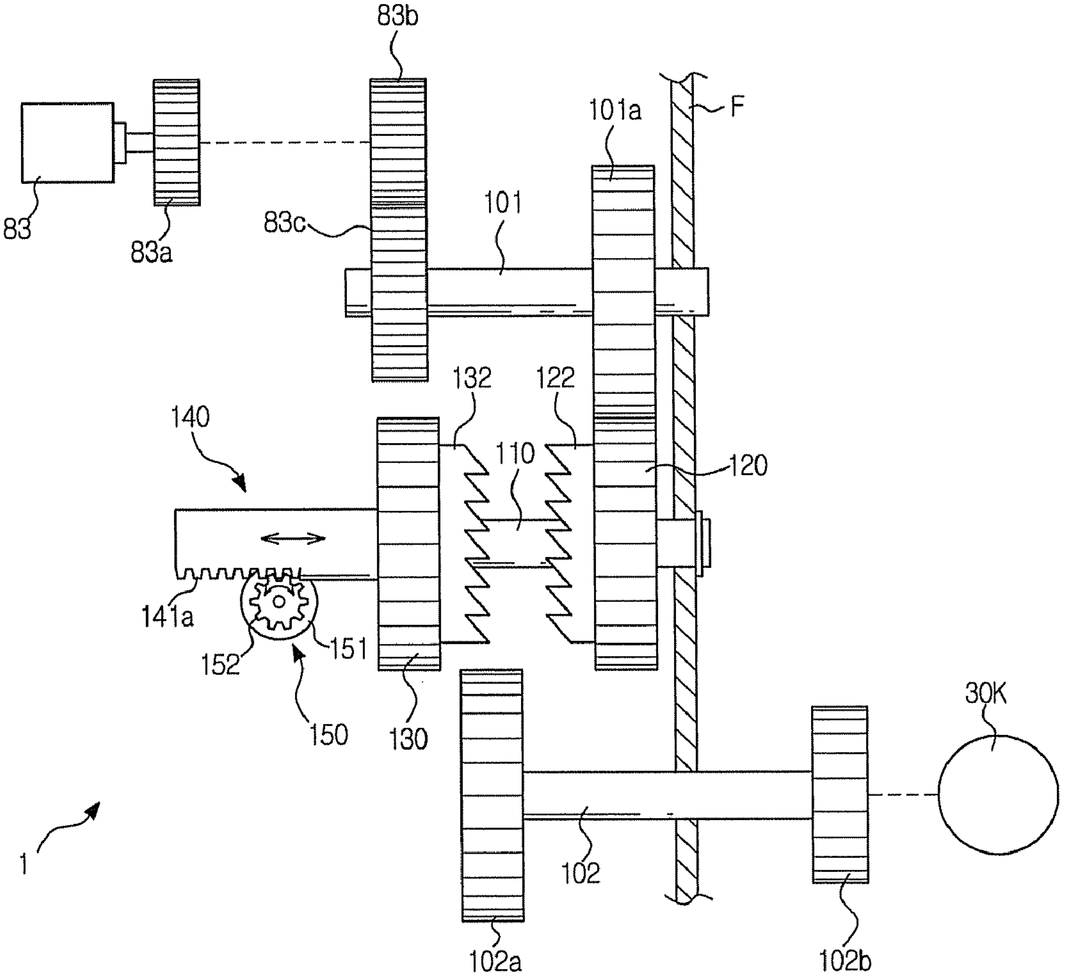
FIG. 3 is a view illustrating the partial constitution of the image forming shown in FIG. 1.
Figure 4:
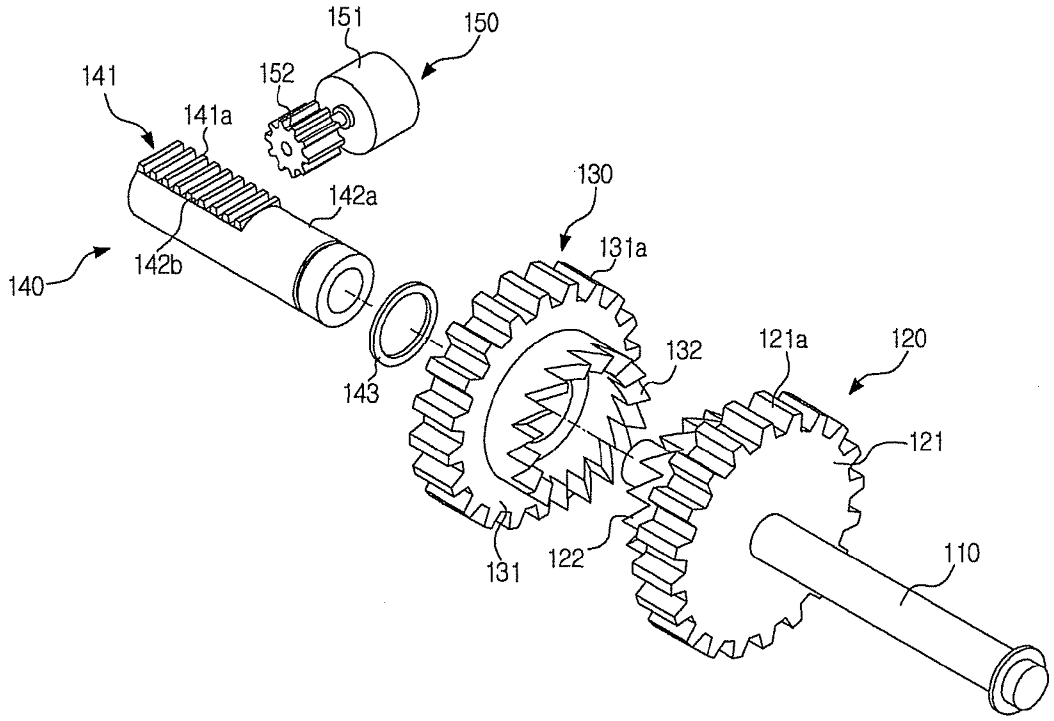
FIG. 4 is an exploded perspective view illustrating the constitution of a power transmission device according to an example embodiment of the present invention.
Figure 5:
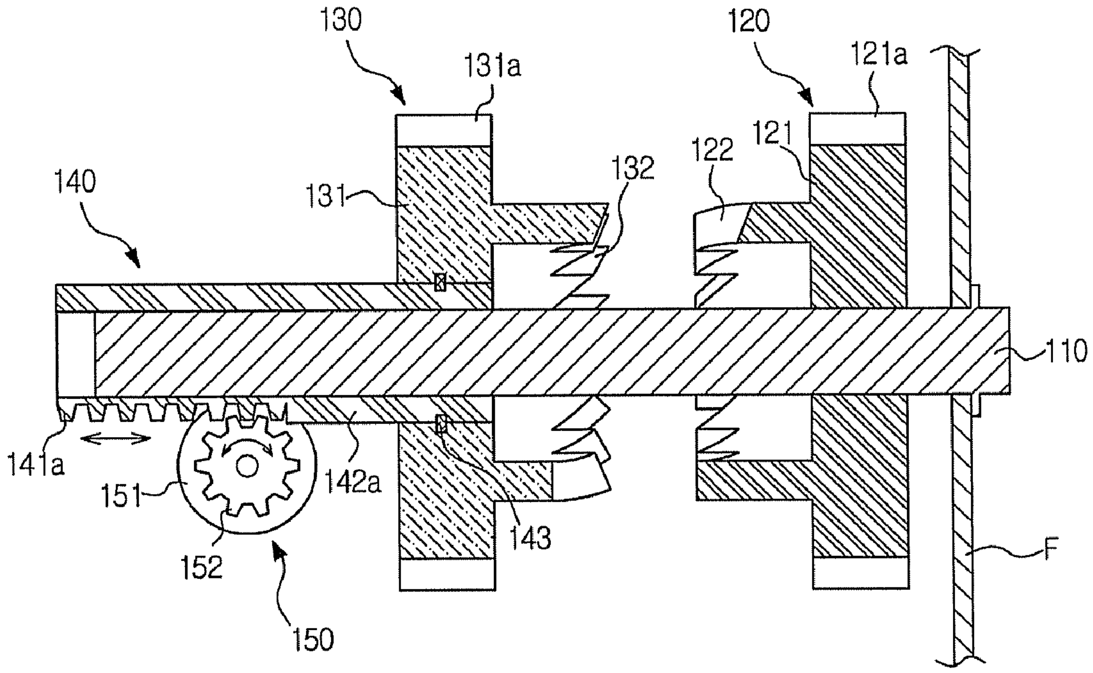
FIG. 5 is a sectional view illustrating the constitution of the power transmission device shown in FIG. 4.

FIG. 3 is a view illustrating the partial constitution of the image forming apparatus 1000. FIGS. 4 and 5 are an exploded perspective view and a sectional view, respectively, illustrating the constitution of the power transmission device 1.

As shown in FIG. 3, the power transmission device 1 includes a shaft 110 fixed to a support frame F, a first intermittent gear 120, a second intermittent gear 130, a sliding unit 140, and a drive unit 150. The first intermittent gear receives power from the driving source 83 and rotates on the shaft 110. The second intermittent gear 130 receives power intermittently from the first intermittent gear 120 and also rotates on the shaft 110. The sliding unit 140 is slidably mounted to the shaft 110. The drive unit 150 drives the sliding unit 140. The second intermittent gear 130 moves along the axial direction of the shaft 110 between a first position in which the second intermittent gear 130 is connected to the first intermittent gear 120 by the sliding unit 140 and a second position in which the second intermittent gear 130 is disconnected from the first intermittent gear 120.

Two power transmission shafts 101 and 102 are rotatably mounted to the support frame F with the shaft 110 therebetween. A first power transmission gear 101*a* is engaged with the first intermittent gear 120 and is coupled to the first power transmission shaft 101. A second power transmission gear 102*a* is intermittently engaged with the second intermittent gear 130 and is coupled to the second power transmission shaft 102.

The driving source 83 transmits power to the first power transmission shaft 101 through a series of gear trains to rotate the first power transmission shaft 101. FIG. 3 shows only three gears 83*a*, 83*b* and 83*c* of a series of gear trains that transmit power to the first power transmission shaft 101. A driving gear 102*b* is coupled to an end of the second power transmission shaft 102. The driving gear 102*b* is engaged with a driven component, i.e., a driven gear (not shown) of the black developing device 30K, and the driven gear is connected to various components, including the developing roller 33, which are mounted in the black developing device 30K. As shown in FIG. 2, the power transmission device 1 intermittently transmits power to the black developing device 30K from the driving source 83. According to other aspects of the present invention, the power transmission device 1 may be applied to any structure in which power from a driving source needs to be intermittently transmitted to a component.

As shown in FIGS. 3 to 5, the first intermittent gear 120 includes a body 121 and a first coupling part 122. The body 121 includes teeth 121*a* at an outer peripheral surface that are engaged with the first power transmission gear 101*a*. The first coupling part 122 protrudes from the body 121 toward the second intermittent gear 130 in the axial direction of the shaft 110.

The second intermittent gear 130 includes a body 131 and a second coupling part 132. The body 131 is formed with teeth 131*a* that are engaged with the second power transmission gear 102*a*. The second coupling part 132 protrudes from the body 131 toward the first coupling part 122. As the second intermittent gear 130 moves along the axial direction of the shaft 110 by the sliding unit 140 while the second coupling part 132 is engaged with the first coupling part 122, power from the driving source 83 is transmitted to the second intermittent gear 130. While the second coupling part 132 is disengaged from the first coupling part 122, rotational force of the first intermittent gear 120 is not transmitted to the second intermittent gear 130.

The sliding unit 140 performs a sliding motion by the driving unit 150. Here, the driving unit 150 includes a motor 151 that rotates in a forward direction and a reverse direction. If the motor 151 rotates in the forward direction, the sliding unit 140 slides toward the first intermittent gear 120, and the second intermittent gear 130 is engaged with the first intermittent gear 120 so as to rotate together therewith. If the motor 151 rotates in the reverse direction, the sliding unit 140 slides away from the first intermittent gear 120, and the second intermittent gear 130 is disengaged from the first intermittent gear 120 to interrupt the power transmission.

As shown in FIG. 4, the motor 151 is used as the driving unit 150. According to other aspects of the present invention, any other type of driving unit that enables the sliding unit 140 to slide along the axial direction of the shaft 110 may be adopted.

In order for the sliding unit 140 to perform a sliding motion using the rotational force of the motor 151, the sliding unit 140 includes a power transforming part 141 that transforms the rotational motion of the motor 151 into a rectilinear motion. As shown in FIG. 4, a rack gear 141*a* may be used as the power transforming part 141.

As shown in FIGS. 4 and 5, the sliding unit 140 has a hollow sliding body 142 through which the shaft 110 is inserted. The hollow sliding body 142 includes a cylindrical portion 142*a* and a surface cut portion 142*b* that is formed by cutting flat an outer peripheral surface of the cylindrical portion 142*a*. A coupling ring 143 is interposed between the outer peripheral surface of the cylindrical portion 142*a* and the inner peripheral surface of the second intermittent gear 130 so that the second intermittent gear 130 is able to rotate with respect to the cylindrical portion 142*a*. The rack gear 141*a* is formed on the surface cut portion 142*b*. The rack gear 141*a* is engaged with a pinion 152 rotated by the motor 151 so as to transform the rotational motion of the motor 151 into the rectilinear motion.

Figure 6:
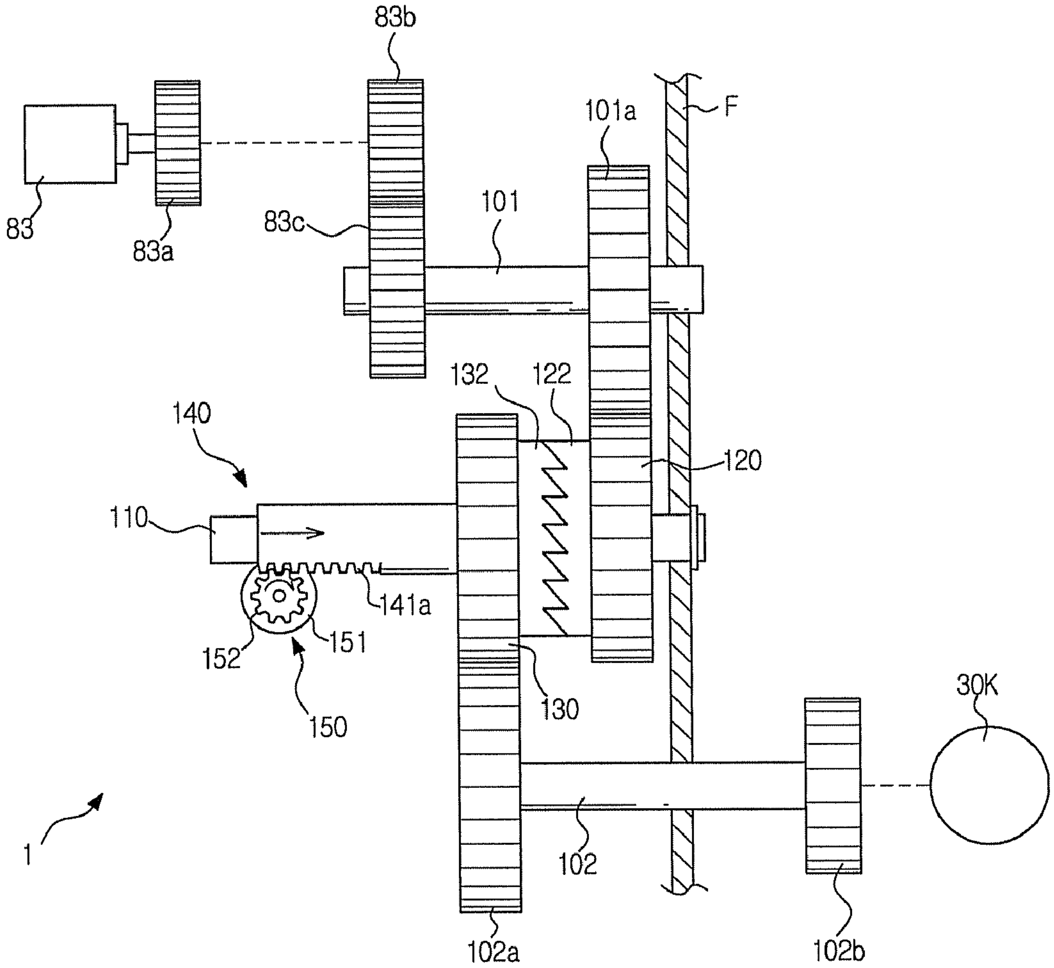
FIG. 6 is a view illustrating a power-transmitted state through the power transmission device shown in FIG. 4.

Hereinafter, the operation of the image forming apparatus 1000 will be described with reference to FIGS. 1 to 3 and 6. FIG. 6 is a view illustrating a power-transmitted state through the power transmission device 1.

If a duplex print command is inputted, the first driving source 81 drives the paper supply unit 10, the photosensitive bodies 31Y, 31M, 31C and 31K and the transfer belt 41. The second driving source 82 drives the rollers of the developing devices 30Y, 30M, and 30C. The third driving source 83 drives the black developing device 30K, the fixing unit 50, the paper discharge unit 60 and the duplex print unit 70.

The paper S is picked up from the paper supply unit 10 and passes between the transfer belt 41 and the photosensitive bodies 31Y, 31M, 31C and 31K. An image is formed on the paper S through the development and transfer processes. The image transferred onto the paper is fixed to the paper S while passing through the fixing unit 50. When the rear end of the paper passes by a discharge sensor (not shown) mounted on the downstream side of the fixing unit 50, the third driving source 83 is reversed. If the third driving source 83 is reversed, the power transmission device 1 interrupts the power transmission to the black developing device 30K, and the oneway clutch 2 interrupts the power transmission to the fixing unit 50. Only the discharge roller 61 and the duplex-print feed rollers 73 rotate in the reverse direction. The paper S is fed to the upstream side of the development unit 30 again via the duplex-print path 71.

Before the front end of the paper S, having passed through the duplex-print path 71, advances between the photosensitive bodies 31Y, 31M, 31C, and 31K and the transfer belt 41, the third driving source 83 is reversed again. The power transmission device 1 is converted to transmit power to the black developing device 30K. The image is formed on the other side of the paper S while undergoing the development, transfer and fixing processes again. The duplex-printed paper S is discharged through the paper discharge unit 60.

The operation of the power transmission device 1 to intermittently transmit power in the above print operation will now be described in detail. As shown in FIG. 3, power from the driving source 83 is transmitted to the first power transmission shaft 101 to rotate the first power transmission shaft 101 and the first power transmission gear 101*a*. If the first power transmission gear 101*a* rotates, the first intermittent gear 120 of the power transmission device 1 engaged with the first power transmission gear 101*a* also rotates. Because the second intermittent gear 130 is disengaged from the first intermittent gear 120, the first intermittent gear 120 is in the idling state, and power is not transmitted to the black developing device 30K.

In this state, if electric current is applied to the motor 151 to rotate the pinion 152 in the clockwise direction, as shown in FIG. 6, then the sliding unit 140 slides toward the first intermittent gear 120 along the axial direction of the shaft 110. The second coupling part 132 of the second intermittent gear 130 engages with the first coupling part 122 of the first intermittent gear 120, and the second intermittent gear 130 engages with the second power transmission gear 102*a*. Accordingly, the rotational force of the first intermittent gear 120 is transmitted to the second power transmission gear 102*a* through the second intermittent gear 130, and the second power transmission shaft 102 rotates so as to transmit power to the black developing device 30K.

In the power-transmitted state, if the motor 151 rotates the pinion 152 in the reverse direction, i.e., in the counterclockwise direction, the sliding unit 140 slides away from the first intermittent gear 120, and the second intermittent gear 130 is disconnected from the first intermittent gear 120. As a result, the power transmission is interrupted.

As apparent from the above description, since the image forming apparatus according to aspects of the present invention is equipped with a power transmission device to which electric current is not needed to be applied continuously in the intermittent power transmission process, operational reliability of the power transmission device is increased, and power consumption is reduced.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, although described with respect to an image forming apparatus, the power transmission device may be employed in any device requiring a power transmission. The power transmission device may also include a controller to control the driving unit. Accordingly, it is intended, therefore, that the present invention not be limited to the various example embodiments disclosed, but that the present invention includes all embodiments falling within the scope of the appended claims.

What is claimed is:

1. A power transmission device of an image forming apparatus, which intermittently transmits power to a driven component from a driving source, comprising:

a shaft;

a first intermittent gear to receive power from the driving source and to rotate on the shaft;

a second intermittent gear arranged so as to move between a first position in which the second intermittent gear is directly connected to the first intermittent gear along an axial direction of the shaft and a second position in which the second intermittent gear is disconnected from the first intermittent gear;

a sliding unit arranged so as to slide along the shaft and to move the second intermittent gear in the axial direction of the shaft; and a driving unit arranged perpendiculary to the axial direction of the shaft to drive the sliding unit, wherein the sliding unit includes a hollow sliding body through which the shaft is inserted and a power transforming part incorporated into the hollow sliding body to transform a rotational motion of the driving unit into a linear motion, and wherein the second intermittent gear is rotatably disposed on an outer peripheral surface of the hollow sliding body to move together with the sliding unit.

2. The power transmission device according to claim 1, wherein the driving unit includes a motor that rotates in a forward direction and a reverse direction.

3. The power transmission device according to claim 1, wherein the power transforming part includes a rack gear.

4. The power transmission device according to claim 1, wherein the second intermittent gear is rotatably mounted to the sliding unit.

5. The power transmission device according to claim 1, wherein:

the first intermittent gear comprises a first coupling part arranged along the axial direction of the shaft; and the second intermittent gear comprises a second coupling part arranged along the axial direction of the shaft opposite the first coupling part so as to engage the second intermittent gear with the first intermittent gear.

6. A power transmission device of an image forming apparatus to intermittently transmits power to a driven component from a driving source, comprising:

a shaft;

a first intermittent gear to receive power from the driving source and arranged so as to rotate on the shaft;

a sliding unit slidably mounted to the shaft, the sliding unit including a hollow sliding body through which the shaft is inserted and a rack gear incorporated into the hollow sliding body;

a second intermittent gear rotatably mounted to an outer peripheral surface of the hollow sliding body of the sliding unit so as to transmit power to the driven component while moving together with the sliding unit; and a motor arranged perpendicularly to an axial direction of the shaft to move the sliding unit between a first position in which the second intermittent gear is directly connected to the first intermittent gear and a second position in which the second intermittent gear is disconnected from the first intermittent gear.

7. The power transmission device according to claim 6, wherein a rack gear provided on the a hollow sliding body as part of the power transforming part.

8. The power transmission device according to claim 6, wherein:

the first intermittent gear comprises a first coupling part arranged along the axial direction of the shaft; and the second intermittent gear comprises a second coupling part arranged along the axial direction of the shaft opposite the first coupling part so as to engage the second intermittent gear with the first intermittent gear.

9. An image forming apparatus including a driving source, a power transmission gear to receive power from the driving source and arranged so as to rotate, and a power transmission device to intermittently transmit power to a driven component from the driving source, the power transmission device comprising:

a shaft;

a first intermittent gear engaged with the power transmission gear so as to rotate on the shaft;

a second intermittent gear arranged so as to rotate on the shaft to receive power from the first intermittent gear, and to transmit power to the driven component;

a sliding unit arranged so as to slide along the shaft in an axial direction of the shaft and to move the second intermittent gear between a first position in which the second intermittent gear is directly connected to the first intermittent gear and a second position in which the second intermittent gear is disconnected from the first intermittent gear; and a driving unit arranged perpendicularly to the axial direction of the shaft to drive the sliding unit, wherein the sliding unit includes a hollow sliding body through which the shaft is inserted and a power transforming part incorporated into the hollow sliding body to transform a rotational motion of the driving unit into a linear motion, and wherein the second intermittent gear is rotatably disposed on an outer peripheral surface of the hollow sliding body to move together with the sliding unit.

10. The image forming apparatus according to claim 9, wherein the driving unit includes a motor to rotate in a forward direction and a reverse direction.

11. The image forming apparatus according to claim 9, wherein the power transforming part includes a rack gear.

12. The image forming apparatus according to claim 11, wherein the driving unit comprises a pinion to engage with the rack gear.

13. The image forming apparatus according to claim 9, wherein:

the sliding unit includes a cylindrical sliding body through which the shaft is inserted, and the second intermittent gear is rotatably mounted to the cylindrical sliding body

* * * * *

UNITED STATES PATENT AND TRADEMARK OFFICE

CERTIFICATE OF CORRECTION

PATENT NO. : 8,276,474 B2
APPLICATION NO. : 11/971228
DATED : October 2, 2012
INVENTOR(S) : Soo Yong Kim et al.

It is certified that error appears in the above-identified patent and that said Letters Patent is hereby corrected as shown below:

In the Claims:

Column 8; Line 7; In Claim 1, delete "perpendiculary" and insert -- perpendicularly --, therefor.
Column 8; Line 55; In Claim 7, delete "gear" and insert -- gear is --, therefor.
Column 8; Line 55; In Claim 7, delete "the a" and insert -- the --, therefor.
Column 10; Line 20 (Approx.); In Claim 13, delete "body" and insert -- body. --, therefor.

Signed and Sealed this
Fourteenth Day of May, 2013

Teresa Stanek Rea
*Acting Director of the United States Patent and Trademark Office*